United States Patent Office 3,365,779
Patented Jan. 30, 1968

3,365,779
CERAMIC-METAL SEAL
Archie G. Buyers and Augustus J. Mohr, Jr., Los Angeles Calif., assignors to Hughes Aircraft Company, Culver City, Calif., a corporation of Delaware
No Drawing. Filed Feb. 20, 1964, Ser. No. 346,065
9 Claims. (Cl. 29—473.1)

This invention relates to a method of producing bonds or seals between a body of ceramic material and a body of metal, and more particularly to a method of making a hermetically tight ceramic-metal seal or joint of the type employed in electrical equipment, between a ceramic body which contains alumina and a metal body of, or which contains, tungsten.

The difficulty of making a strong, reliable, hermetic seal capable of withstanding vibration over a wide range of temperatures is well known in the art. Such seals are required as interelectrode seals for thermionic converters, sealing components for use in high temperature vacuum tubes, bonding heat shielding ceramics, sealing together various ceramic and metal parts used in high temperature systems, etc. Among the difficulties encountered in making a satisfactory high temperature stable ceramic-metal seal or bond are differences in thermal expansion of the ceramic and metal in terms of rate and extent, differences in crystal habit for either of the seal components, interfacial energies which prevent wetting of one component by the other, and the formation of intermediate bonding compounds whose properties are incompatible with those of the original seal components. Consequently it is very difficult to make a ceramic-metal seal or bond which will exhibit satisfactory stability at temperatures much above about 1200° C.

Accordingly, it is an important object of this invention to provide a method of making a ceramic-metal seal or bond having very high temperature stability with materials whose technology is well developed.

Another object of the invention is to provide a method of making a high temperature stable ceramic-metal seal or bond which is suitable for use with electrical equipment such as thermionic converters, vacuum tubes, and the like.

A further object is to provide a ceramic-metal seal or bond having strength, reliability and hermetic properties both at extremely low temperatures and very high temperatures.

Additional objects of this invention will become apparent from the following description, which is given primarily for purposes of illustration, and not limitation.

Stated in general terms, the objects of this invention are attained by making a ceramic to metal seal or bond by bringing together preferably in a two-step procedure, a body of alumina ceramic and a body of tantalum, or tantalum foil, titanium or titanium foil and tungsten metal, in an inert atmosphere, and individually and at different times raising the temperature of the bodies in the zones of contact to two different temperatures, at the higher of which the tantalum metal and alumina ceramic-bond or seal to each other, and at the lower temperature, the titanium bonds or seals the already bonded tantalum-alumina to tungsten metal.

The objects of this invention also can be attained by bringing together, in a one-step procedure, to make a ceramic-to-metal bond or seal, a body of alumina ceramic and a body or foil of titanium, and tungsten metal, in an inert atmosphere or vacuum, and raising the temperature of the bodies in the zone of contact to a temperature at which the bodies seal or bond to each other.

The alumina ceramic employed in making the seals of the invention can be made by standard commercial processes, known to the technology, which produce fired, sintered or hot pressed alumina bodies. However, the alumina ceramic used in this invention can contain relatively large amounts of other suitable metal, high temperature compounds. By suitable compounds is meant any oxide or refractory mixture capable of containing alumina which will bond with tantalum or tantalum-containing metals through the formation of bonding intermediates, containing tantalum, of the type described hereinbelow. Mixtures of magnesia (25–30 mole percent) and alumina (70–75 mole percent); mixtures of alumina (1–50 mole percent) and aluminum carbide (99–50 mole percent) $Al_4C_3$; and mixtures of alumina-chromia in all compositions.

The tungsten metal, in addition to pure tungsten metal, can be an alloy of tungsten with metals which are compatible with tungsten. Among these alloying metals are tantalum, molybdenum, rhenium, niobium, and other high melting or refractory metals. An example of one such alloy is the alloy containing 90% tantalum and 10% tungsten.

In the claims, where tungsten, titanium or tantalum is used, it includes alloys thereof which are operable in the bonding process.

The inert atmosphere employed in forming the seal or bond, which includes an evacuated, or partially evacuated atmosphere, is formed by the use of an atmosphere, or partial atmosphere of gas such as argon, helium, or another of the inert gases, or mixtures thereof.

The temperature of the alumina ceramic and the tantalum base metal is raised to about 1950° C., but not above about 2000° C. Once the titanium has been introduced, the temperature should not exceed approximately 1800° C. An induction heating furnace has been used for this purpose, but other suitable heating means such as electrical resistance, arc, or electron beam methods, can be used. The heating cycle employed consists of heating the tantalum and alumina seal components to to about 1950° C., but not in excess of about 2000° C., and then allowing the bond or seal to cool to room temperature. Titanium metal is then brought into contact with the bonded tantalum-alumina on the tantalum side between this latter and a tungsten metal body. This composite, tantalum-alumina-titanium-tungsten, is then heated to approximately 1800° C. for a brief period, 5–10 minutes, and allowed to cool to room temperature.

In the second or one step method for accomplishing the invention objectives, no tantalum is employed. Titanium metal is inserted between alumina ceramic and tungsten metal bodies and the temperature is raised to about 1800° C., near which temperature a bond or seal forms between the alumina ceramic, the titanium metal and tungsten metal. The bond or seal is then allowed to cool to room temperature.

The following examples illustrate the use of the method of the invention to produce high temperature stable seals.

*Example 1*

An alumina ceramic consisting of 99.0 percent alumina was brought into contact with pure tantalum metal and placed in an induction heating furnace in an atmosphere of argon or in a vacuum. The heating cycle employed consisted of immediate heating of these seal components to about 1950° C., followed by maintaining this temperature for about five minutes, and subsequent cooling to room temperature at a rate sufficiently slow to prevent thermal stresses from cracking the alumina. The titanium metal body or foil is placed in contact with the tantalum face of the tantalum-alumina fabrication and a tungsten metal body, placed into the induction heating furnace in an atmosphere of argon or a vacuum. The heating cycle employed consisted of immediate reheating of the seal components to approximately 1800° C., followed by maintaining this temperature for about five minutes and subsequent cooling to room temperature at a rate sufficiently slow to prevent thermal stresses from cracking the alumina.

*Example 2*

Pure tungsten metal was faced with titanium or thin sheet. Only the second heating cycle of Example 1 was employed and the resulting seal produced had properties similar to those produced by the method of Example 1.

In the cases illustrated in Examples 1 and 2, the bonded regions withstood immersion in liquid nitrogen and repeated cycling from room temperature to 1800° C. during short time intervals, of about one to two minutes. The alumina frequently broke as the result of thermal shock. An X-ray diffraction analysis indicated that the intermediate compound, aluminum tantalate, $Al_6Ta_4O_{19}$, which produces the first bond or seal, was formed. Titanium monoxide was present at the bonded interface in the completed seals and bonds.

Obviously many other modifications and variations of the present invention are possible in the light of the above teachings. It is therefore to be understood that within the scope of the appended claims the invention can be practiced otherwise than as specifically described.

What is claimed is:

1. A method of making a ceramic-metal seal between a body which contains alumina ceramic and a body which contains tungsten which comprises the steps of:
    (a) bringing a body of tungsten metal into contact with a titanium sheet which is in turn in contact with an alumina ceramic;
    (b) enclosing the contact materials in an inert atmosphere;
    (c) raising the temperature of the contacted materials to above about 1800° C., to bond the tungsten metal to the alumina ceramic at their zones of contact with the inserted titanium sheet.

2. A method of making a ceramic-metal seal between a body which contains alumina ceramic and a body which contains tungsten which comprises the steps of:
    (a) bringing a body of alumina ceramic into contact with a body of tantalum;
    (b) enclosing the contact materials in an inert atmosphere;
    (c) raising the temperature of the contacted bodies above about 1950° C. to form bonding intermediate compounds containing tantalum;
    (d) cooling the contacted bodies;
    (e) bringing titanium sheet into contact with the tantalum face of the tantalum-alloy-alumina bond;
    (f) placing a tungsten metal body on the titanium sheet;
    (g) heating the resulting alumina-tantalum-alloy-titanium-tungsten assembly to approximately 1800° C. for bonding the resulting materials to produce an alumina-ceramic to tungsten metal bond; and
    (h) cooling the resultant bonded bodies.

3. A method of making a ceramic-metal seal between a body which contains alumina ceramic and a body which contains tungsten which comprises the steps of:
    (a) bringing a body having a composition of magnesia of about 25–30 mole percent and alumina of about 75–75 mole percent based on the mixture, into contact with a body of tantalum;
    (b) enclosing the contacted bodies in an inert gas atmosphere;
    (c) raising the temperature of the contacted bodies above about 1950° C. to form bonding intermediate compounds containing tantalum;
    (d) cooling the contacted bodies;
    (e) bringing titanium sheet into contact with the tantalum face of the tantalum-alloy-alumina bond;
    (f) placing a tungsten metal body on the titanium sheet;
    (g) heating the resulting alumina-tantalum-alloy-titanium-tungsten assembly to approximately 1800° C. for bonding the resulting materials to produce an alumina-ceramic to tungsten metal bond; and
    (h) cooling the resultant bonded bodies.

4. A method of making a ceramic-metal seal between a body which contains alumina ceramic and a body which contains tungsten which comprises the steps of:
    (a) bringing a body of alumina-aluminum carbide ceramic consisting essentially of a binary mixture, where alumina is present in about 1 to 50 mole percent based on the binary mixture, into contact with a body of tantalum;
    (b) enclosing the contacted bodies in an inert atmosphere;
    (c) raising the temperature of the contacted bodies above about 1950° C. to form bonding intermediate compounds containing tantalum;
    (d) cooling the contacted bodies;
    (e) bringing titanium sheet into contact with the tantalum face of the tantalum alloy-alumina bond;
    (f) placing a tungsten metal body on the titanium sheet;
    (g) heating the resulting alumina-tantalum alloy-titanium-tungsten assembly to approximately 1800° C. for bonding the resulting materials to produce an alumina-ceramic to tungsten metal bond; and
    (h) cooling the resultant bonded bodies.

5. A method of making a ceramic-metal seal between a body which contains alumina ceramic and a body which contains tungsten which comprises the steps of:
    (a) bringing a body of alumina-chromia ceramic into contact with a body of tantalum;
    (b) enclosing the contacted bodies in an inert gas atmosphere;
    (c) raising the temperature of the contacted bodies above about 1950° C. to form bonding intermediate compounds containing tantalum;
    (d) cooling the contacted bodies;
    (e) bringing titanium sheet into contact with the tantalum face of the tantalum alloy-alumina bond;
    (f) placing a tungsten metal body on the titanium sheet;
    (g) heating the resulting alumina-tantalum alloy-titanium-tungsten assembly to approximately 1800° C. for bonding the resulting materials to produce an alumina-ceramic to tungsten metal bond; and
    (h) cooling the resultant bonded bodies.

6. A method of making a ceramic-metal seal between a body which contains alumina ceramic and a body which contains tungsten which comprises the steps of:
    (a) bringing a body of magnesia-alumina ceramic consisting essentially of 25–30 mole percent magnesia and 75–70 mole percent alumina based on the mixture into contact with a body of tantalum;
    (b) enclosing the contacted bodies in an inert gas atmosphere;
    (c) raising the temperature of the contacted bodies above about 1950° C. to form bonding intermediate compounds containing tantalum;
    (d) cooling the contacted bodies;
    (e) bringing titanium sheet into contact with the tantalum face of the tantalum-alumina bond;
    (f) placing a tungsten metal body on the titanium sheet;
    (g) heating the resulting alumina-tantalum-titanium-tungsten assembly to approximately 1800° C. for bonding the resulting materials to produce an alumina-ceramic to tungsten metal bond; and
    (h) cooling the resultant bonded bodies.

7. A method of making a ceramic-metal seal between a body which contains alumina ceramic and a body which contains tungsten which comprises the steps of:

(a) bringing a body of magnesia-alumina ceramic consisting essentially of 25–30 mole percent magnesia and 75–70 mole percent alumina based on the mixture into contact with a body of titanium sheet which is in turn in contact with a tungsten metal body;
(b) enclosing the contacted bodies in an inert gas atmosphere;
(c) raising the temperature of the contacted bodies above about 1800° C. to form bonding intermediate compounds containing titanium; and
(d) cooling the resulting bonded bodies.

8. A method of making a ceramic-metal seal between a body which contains alumina ceramic and a body which contains tungsten which comprises the steps of:
(a) bringing a body of alumina-aluminum carbide ceramic, consisting essentially of 1–50 mole percent alumina based upon the mixture, the balance being aluminum carbide, into contact with titanium sheet which is in turn in contact with a tungsten metal body;
(b) enclosing the contacted bodies in an inert gas atmosphere;
(c) raising the temperature of the contacted bodies above about 1800° C. to form bonding intermediate compounds containing titanium; and
(d) cooling the resulting bonded bodies.

9. A method of making a ceramic-metal seal between a body which contains alumina ceramic and a body which contains tungsten which comprises the steps of:
(a) bringing a body of alumina-chromia ceramic into contact with a titanium sheet which is in turn in contact with a tungsten metal body;
(b) enclosing the contacted bodies in an inert gas atmosphere;
(c) raising the temperature of the contacted bodies above about 1800° C. to form bonding intermediate compounds containing titanium; and
(d) cooling the resulting bonded bodies.

References Cited
UNITED STATES PATENTS

| | | | |
|---|---|---|---|
| 1,014,757 | 1/1912 | Keys et al. | 65—36 |
| 2,167,431 | 7/1939 | Bowie | 29—472.9 |
| 3,055,465 | 9/1962 | Pulfrich | 29—473.1 |
| 3,139,680 | 7/1964 | Scuro | 29—294 |
| 3,243,313 | 3/1966 | Aves | 65—59 |
| 3,074,143 | 1/1963 | Smith | 65—59 X |
| 3,142,886 | 8/1964 | Bronsen et al. | 65—59 X |

FOREIGN PATENTS 560,281  7/1958  Canada.

DONALL H. SYLVESTER, *Primary Examiner.*

R. L. LINDSAY, *Assistant Examiner.*

UNITED STATES PATENT OFFICE
CERTIFICATE OF CORRECTION

Patent No. 3,365,779　　　　　　　　　　　　January 30, 1968

Archie G. Buyers et al.

It is hereby certified that error appears in the above numbered patent requiring correction and that the said Letters Patent should read as corrected below.

Column 3, line 66, for "75-75 mole" read -- 75-70 mole --.

Signed and sealed this 6th day of May 1969.

(SEAL)
Attest:

Edward M. Fletcher, Jr.
Attesting Officer

Commissioner of Patents